United States Patent
Petrosky

(10) Patent No.: US 10,910,117 B2
(45) Date of Patent: Feb. 2, 2021

(54) WIRELESSLY EMITTING SIGNALS CORRESPONDING TO DETECTED NEUTRON FLUX

(71) Applicant: Westinghouse Electric Company LLC, Cranberry Township, PA (US)

(72) Inventor: Lyman J. Petrosky, Latrobe, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

(21) Appl. No.: 16/889,357

(22) Filed: Jun. 1, 2020

(65) Prior Publication Data

US 2020/0365287 A1 Nov. 19, 2020

Related U.S. Application Data

(62) Division of application No. 15/417,504, filed on Jan. 27, 2017, now Pat. No. 10,672,527.

(51) Int. Cl.
*G21C 17/108* (2006.01)
*G21C 17/112* (2006.01)

(52) U.S. Cl.
CPC .......... *G21C 17/108* (2013.01); *G21C 17/112* (2013.01)

(58) Field of Classification Search
CPC ............................ G21C 17/108; G21C 17/112
USPC ....................................................... 376/254
See application file for complete search history.

(56) References Cited

U.S. PATENT DOCUMENTS

| | | | |
|---|---|---|---|
| 4,943,683 A | 7/1990 | Utsunomiya et al. |
| 10,672,527 B2 | 6/2020 | Petrosky |
| 2012/0177166 A1 | 7/2012 | Seidel et al. |
| 2012/0223242 A1 | 9/2012 | Brown et al. |
| 2013/0083879 A1 | 4/2013 | Heibel et al. |
| 2014/0270040 A1 | 9/2014 | Lam et al. |
| 2018/0218797 A1 | 8/2018 | Petrosky |

FOREIGN PATENT DOCUMENTS

| | | |
|---|---|---|
| JP | 2009139310 A | 6/2009 |
| JP | 2010281703 A | 12/2010 |
| WO | 2014204541 A2 | 12/2014 |
| WO | 2018169592 A2 | 9/2018 |

OTHER PUBLICATIONS

Extended Search Report for European Application No. 17901186.1, dated Aug. 17, 2020.
International Search Report and Written Opinion for International PCT Application No. PCT/US2017/067478, dated Oct. 8, 2018.
International Preliminary Report on Patentability for International PCT Application No. PCT/US2017/067478, dated Jul. 30, 2019.

*Primary Examiner* — Jack W Keith
*Assistant Examiner* — Daniel Wasil
(74) *Attorney, Agent, or Firm* — K&L Gates LLP

(57) ABSTRACT

A transmitter device includes a neutron detector structured to detect neutron flux, a capacitor electrically connected in parallel with the neutron detector, a gas discharge tube having an input end and an output end, and an antenna electrically connected to the output end. The input end is electrically connected with the capacitor. The antenna is structured to emit a signal corresponding to the neutron flux.

4 Claims, 9 Drawing Sheets

WIRELESSLY EMITTING SIGNALS CORRESPONDING TO DETECTED NEUTRON FLUX

BACKGROUND

Field

The disclosed concept pertains generally to nuclear reactor systems. The disclosed concept also pertains to transmitter devices for nuclear reactor systems. The disclosed concept further pertains to methods of measuring environmental conditions with a transmitter device.

Background Information

In many state-of-the-art nuclear reactor systems in-core sensors are employed for measuring the radioactivity within the core at a number of axial elevations. These sensors are used to measure the radial and axial distribution of the power inside the reactor core. This power distribution measurement information is used to determine whether the reactor is operating within nuclear power distribution limits. The typical in-core sensor used to perform this function is a self-powered detector that produces an electric current that is proportional to the amount of fission occurring around it. This type of sensor does not require an outside source of electrical power to produce the current and is commonly referred to as a self-powered detector and is more fully described in U.S. Pat. No. 5,745,538, issued Apr. 28, 1998, and assigned to the Assignee of this invention. FIG. 1 provides a diagram of the mechanisms that produce the current I(t) in a self-powered detector element 10. A neutron sensitive material such a vanadium is employed for the emitter element 12 and emits electrons in response to neutron irradiation. Typically, the self-powered detectors are grouped within instrumentation thimble assemblies. A representative in-core instrumentation thimble assembly 16 is shown in FIG. 2. The signal level generated by the essentially non-depleting neutron sensitive emitter 12 shown in FIG. 1 is low, however, a single, full core length neutron sensitive emitter element provides an adequate signal without complex and expensive signal processors. The proportions of the full length signal generated by the single neutron sensitive emitter element attributable to various axial regions of the core are determined from apportioning the signal generated by different lengths of gamma sensitive elements 14 which define the axial regions of the core and are shown in FIG. 2. The apportioning signals are ratioed which eliminates much of the effects of the delayed gamma radiation due to fission products. The in-core instrumentation thimble assemblies also include a thermocouple 18 for measuring the temperature of the coolant exiting the fuel assemblies. The electrical signal output from the self-powered detector elements and the thermocouple in each in-core instrumentation thimble assembly in the reactor core are collected at the electrical connector 20 and sent to a location well away from the reactor for final processing and use in producing the measured core power distribution.

FIG. 3 shows an example of a core monitoring system presently offered for sale by Westinghouse Electric Company LLC, Cranberry, Pa., with a product name WINCISE™ that employs fixed in-core instrumentation thimble assemblies 16 within the instrument thimbles of the fuel assemblies within the core to measure the core's power distribution. Cabling 22 extends from the instrument thimble assemblies 16 through the containment seal table 24 to a single processing cabinet 26 where the outputs are conditioned, digitized and multiplexed and transmitted through the containment walls 28 to a computer workstation 30 where they can be further processed and displayed. The thermocouple signals from the in-core instrumentation thimble assemblies are also sent to a reference junction unit 32 which transmits the signals to an inadequate core cooling monitor 34 which communicates with the plant computer 36 which is also connected to the workstation 30. Because of the hostile environment within the containment walls 28, the signal processing cabinet 26 has to be located a significant distance away from the core and the signal has to be sent from the detectors 16 to the signal processing cabinet 26 through specially constructed cables that are extremely expensive and the long runs reduce the signal to noise ratio. Unfortunately, these long runs of cable have proved necessary because the electronics for signal processing has to be shielded from the highly radioactive environment surrounding the core region.

In previous nuclear plant designs, the in-core detectors entered the reactor vessel from the lower hemispherical end and entered the fuel assemblies' instrument thimble from the bottom fuel assembly nozzle. In at least some of the current generation of nuclear plant designs, such as the AP1000 nuclear plant, the in-core monitoring access is located at the top of the reactor vessel, which means that during refueling all in-core monitoring cabling will need to be removed before accessing the fuel. A wireless in-core monitor that is self-contained within the fuel assemblies and wirelessly transmits the monitored signals to a signal receiver positioned inside the reactor vessel but away from the fuel would allow immediate access to the fuel without the time-consuming and expensive process of disconnecting, withdrawing and storing the in-core monitoring cables before the fuel assemblies could be accessed, and restoring those connections after the refueling process is complete. A wireless alternative would thus save days in the critical path of a refueling outage. A wireless system also allows every fuel assembly to be monitored, which significantly increases the amount of core power distribution information that is available.

However, a wireless system requires that electronic components be located at or near the reactor core where gamma and neutron radiation and high temperatures would render semi-conductor electronics inoperable within a very short time. Vacuum tubes are known to be radiation insensitive, but their size and electric current demands have made their use impractical until recently. Recent developments in micro-electromechanical devices have allowed vacuum tubes to shrink to integrated circuit component sizes and significantly reduce power draw demands. Such a system is described in U.S. patent application Ser. No. 12/986,242, entitled "Wireless In-core Neutron Monitor," filed Jan. 7, 2011. The primary electrical power source for the signal transmitting electrical hardware for the embodiment disclosed in the afore-noted patent application is a rechargeable battery shown as part of an exemplary power supply. The charge on the battery is maintained by the use of the electrical power produced by a dedicated power supply self-powered detector element that is contained within the power supply, so that the nuclear radiation in the reactor is the ultimate power source for the device and will continue so long as the dedicated power supply self-powered detector element is exposed to an intensity of radiation experienced within the core.

Accordingly, one object of this disclosed concept is to provide a mechanism to transmit data of environmental conditions within an instrument thimble of a fuel assembly to a remote location.

SUMMARY

These needs and others are met by the disclosed concept, which are directed to an improved nuclear reactor system, transmitter device therefor, and associated method of measuring a number of environmental conditions.

As one aspect of the disclosed concept, a transmitter device includes a neutron detector structured to detect neutron flux, a capacitor electrically connected in parallel with the neutron detector, a gas discharge tube having an input end and an output end, and an antenna electrically connected to the output end. The input end is electrically connected with the capacitor. The antenna is structured to emit a signal corresponding to the neutron flux.

As another aspect of the disclosed concept, a nuclear reactor system including a fuel assembly having an instrument thimble, and the aforementioned transmitter device is provided.

As another aspect of the disclosed concept, a method of measuring a number of environmental conditions with the aforementioned transmitter device is provided. The method includes the steps of detecting neutron flux with the neutron detector; storing energy in the capacitor until a breakdown voltage of the gas discharge tube is reached; and emitting a signal with the antenna corresponding to the neutron flux.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

The primary side of nuclear power generating systems which are cooled with water under pressure comprises a closed circuit which is isolated from and in heat exchange relationship with a secondary side for the production of useful energy. The primary side comprises the reactor vessel enclosing a core internal structure that supports a plurality of fuel assemblies containing fissile material, the primary circuit within heat exchange steam generators, the inner volume of a pressurizer, pumps and pipes for circulating pressurized water; the pipes connecting each of the steam generators and pumps to the reactor vessel independently. Each of the parts of the primary side comprising a steam generator, a pump and a system of pipes which are connected to the reactor vessel form a loop of the primary side.

Figure 1:
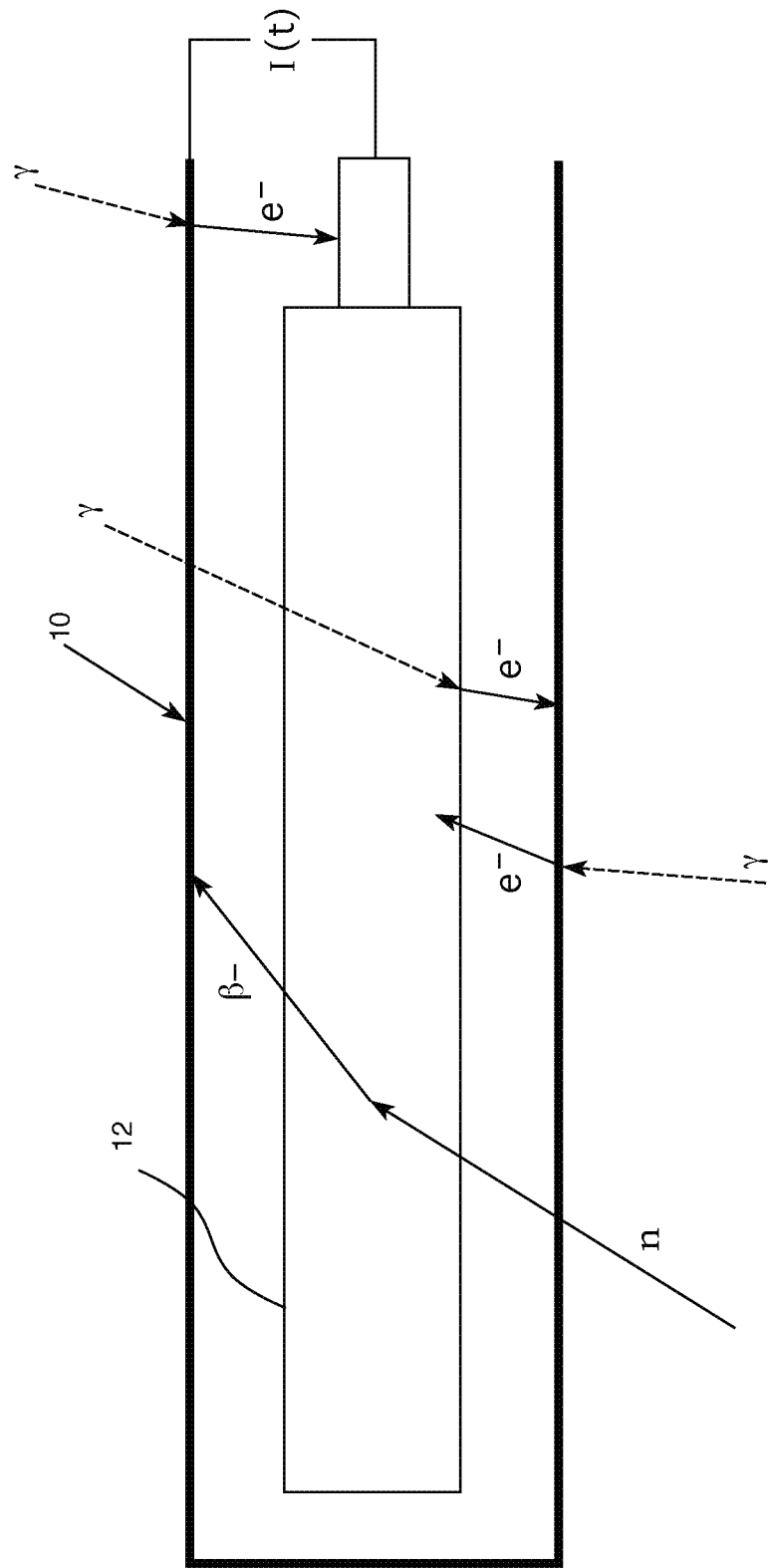
FIG. 1 is a schematic representation of a self-powered radiation detector.
Figure 2A:
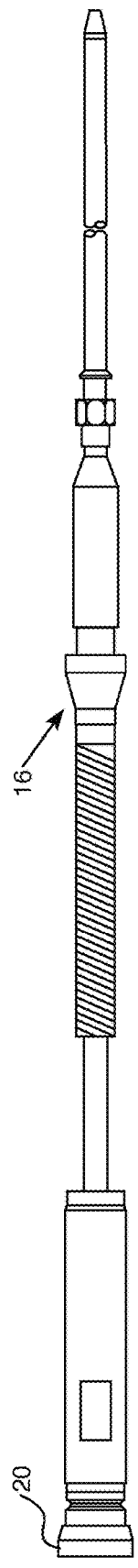
FIG. 2A is a plan view of an in-core instrument thimble.
Figure 2B:
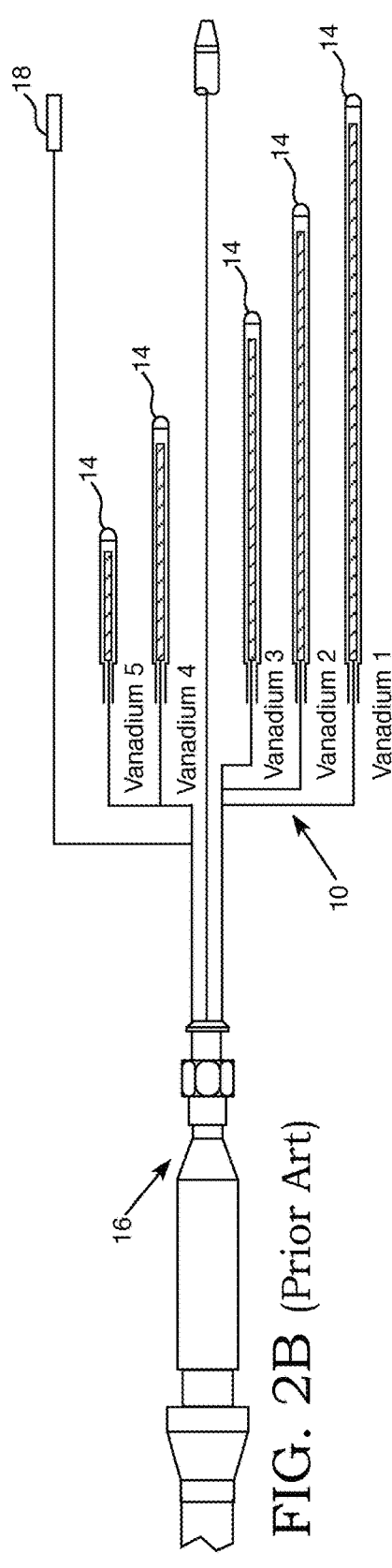
FIG. 2B is a schematic view of the interior of the forward sheath of the in-core instrument thimble assembly of FIG. 2A.
Figure 2C:
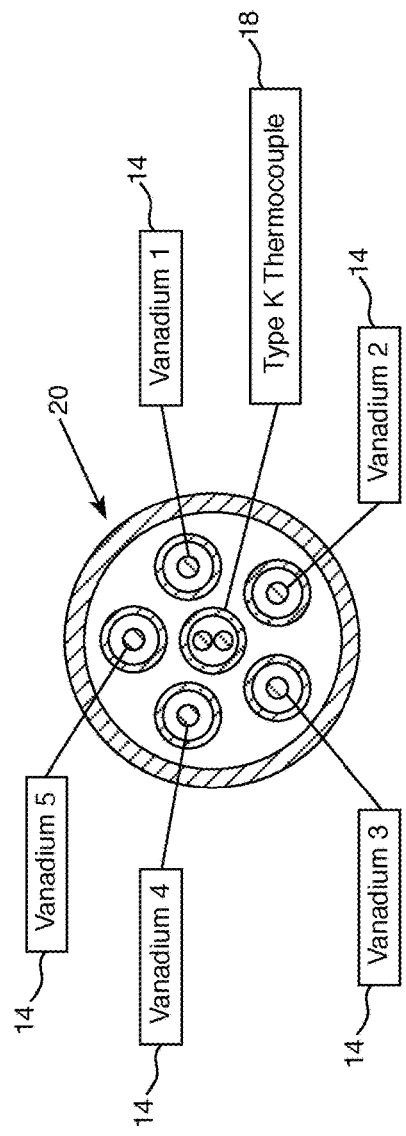
FIG. 2C is a sectional view of the electrical connector at the rear end of the in-core instrument thimble assembly of FIG. 2A.
Figure 3:
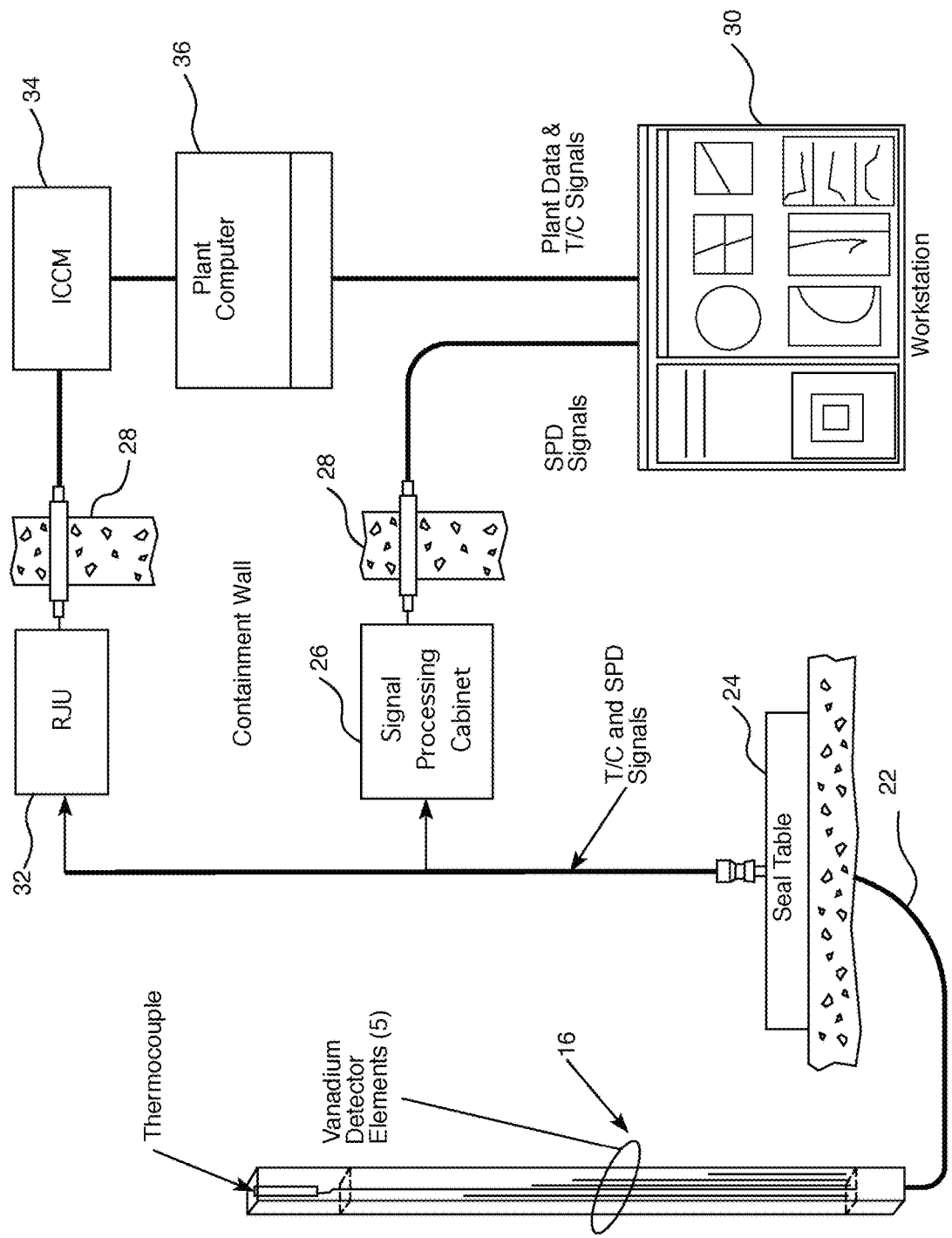
FIG. 3 is a schematic layout of an in-core monitoring system.
Figure 4:
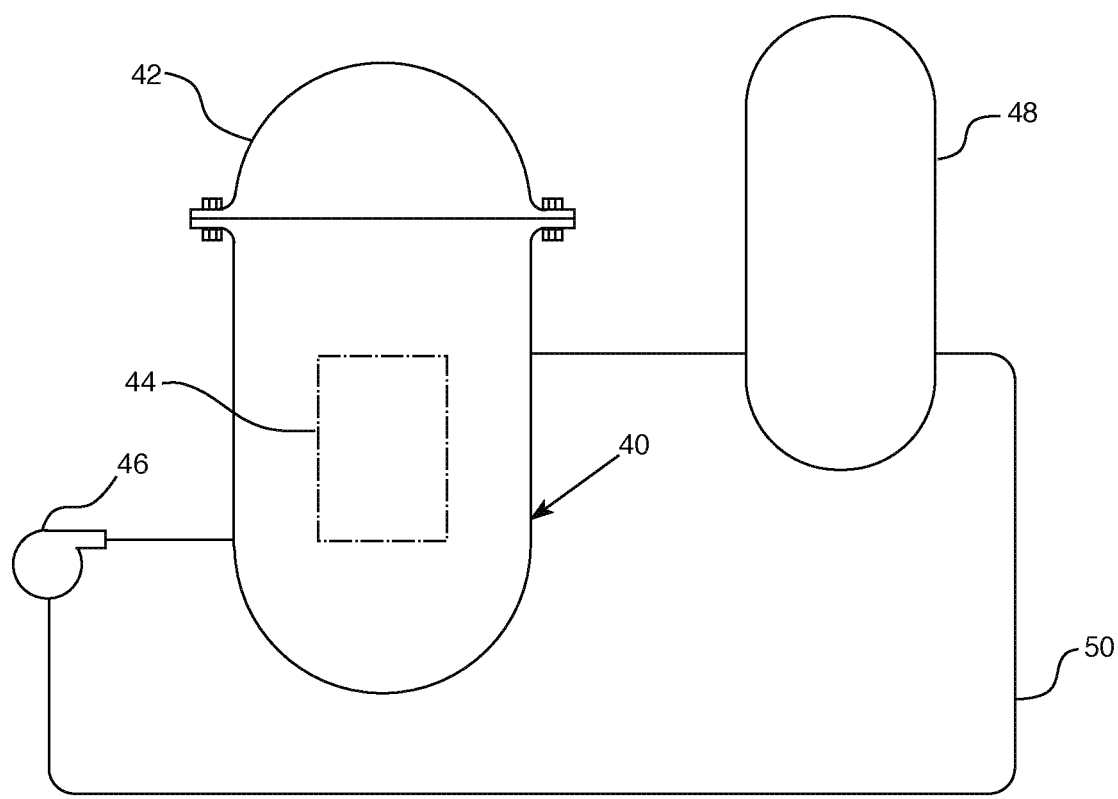
FIG. 4 is a simplified schematic of a nuclear reactor system.

For the purpose of illustration, FIG. 4 shows a simplified nuclear reactor system, including a generally cylindrical pressure vessel 40, having a closure head 42 enclosing a nuclear core 44. A liquid reactor coolant, such as water, is pumped into the vessel 40 by pump 46 through the core 44 where heat energy is absorbed and is discharged to a heat exchanger 48, typically referred to as a steam generator, in which heat is transferred to a utilization circuit (not shown), such as a steam driven turbine generator. The reactor coolant is then returned to the pump 46 completing the primary loop. Typically, a plurality of the above-described loops are connected to a single reactor vessel 40 by reactor coolant piping 50.

Figure 5:
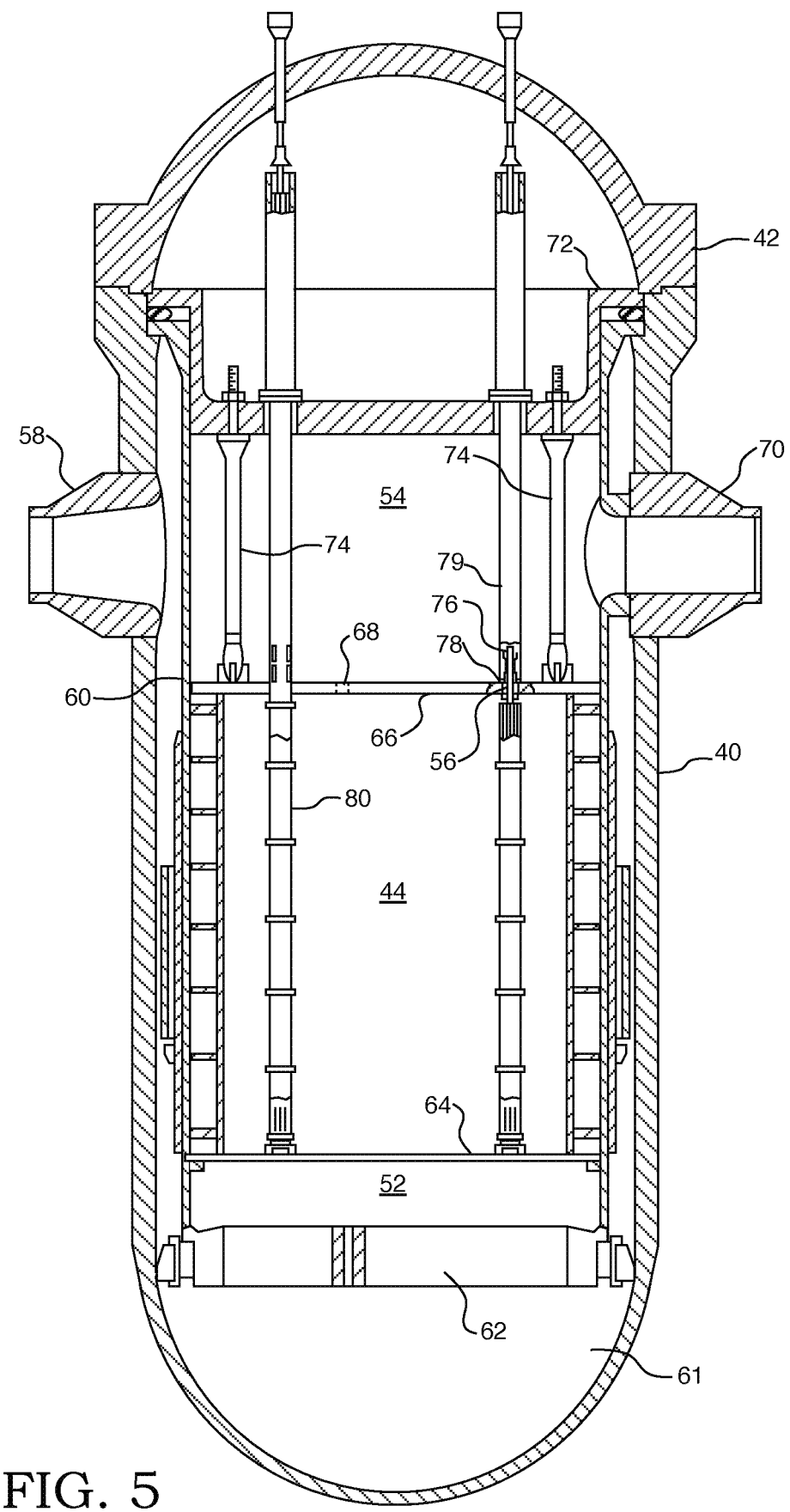
FIG. 5 is an elevational view, partially in section, of a nuclear reactor vessel and interior components.

An exemplary reactor design to which this invention can be applied is illustrated in FIG. 5. In addition to the core 44 comprised of a plurality of parallel, vertical, co-extending fuel assemblies 80, for purpose of this description, the other vessel internal structures can be divided into the lower internals 52 and the upper internals 54. In conventional designs, the lower internals' function is to support, align and guide core components and instrumentation as well direct flow within the vessel. The upper internals 54 restrain or provide a secondary restraint for the fuel assemblies 80 (only two of which are shown for simplicity in this figure), and support and guide instrumentation and components, such as control rods 56. In the exemplary reactor shown in FIG. 5, coolant enters the reactor vessel 40 through one or more inlet nozzles 58, flows down through an annulus between the reactor vessel 40 and the core barrel 60, is turned 180° in a lower reactor vessel plenum 61, passes upwardly through a lower support plate and a lower core plate 64 upon which the fuel assemblies 80 are seated, and through and about the assemblies. In some designs, the lower support plate 62 and the lower core plate 64 are replaced by a single structure, the lower core support plate that has the same elevation as 62. Coolant exiting the core 44 flows along the underside of the upper core plate 66 and upwardly and through a plurality of perforations 68 in the upper core plate 66. The coolant then flows upwardly and radially to one or more outlet nozzles 70.

The upper internals 54 can be supported from the vessel or the vessel head 42 and includes an upper support assembly 72. Loads are transmitted between the upper support assembly 72 and the upper core plate 66 primarily by a plurality of support columns 74. Each support column is aligned above a selected fuel assembly 80 and perforations 68 in the upper core plate 66.

The rectilinearly movable control rods 56 typically include a drive shaft 76 and a spider assembly 78 of neutron poison rods that are guided through the upper internals 54 and into aligned fuel assemblies 80 by control rod guide tubes 79.

Figure 6:
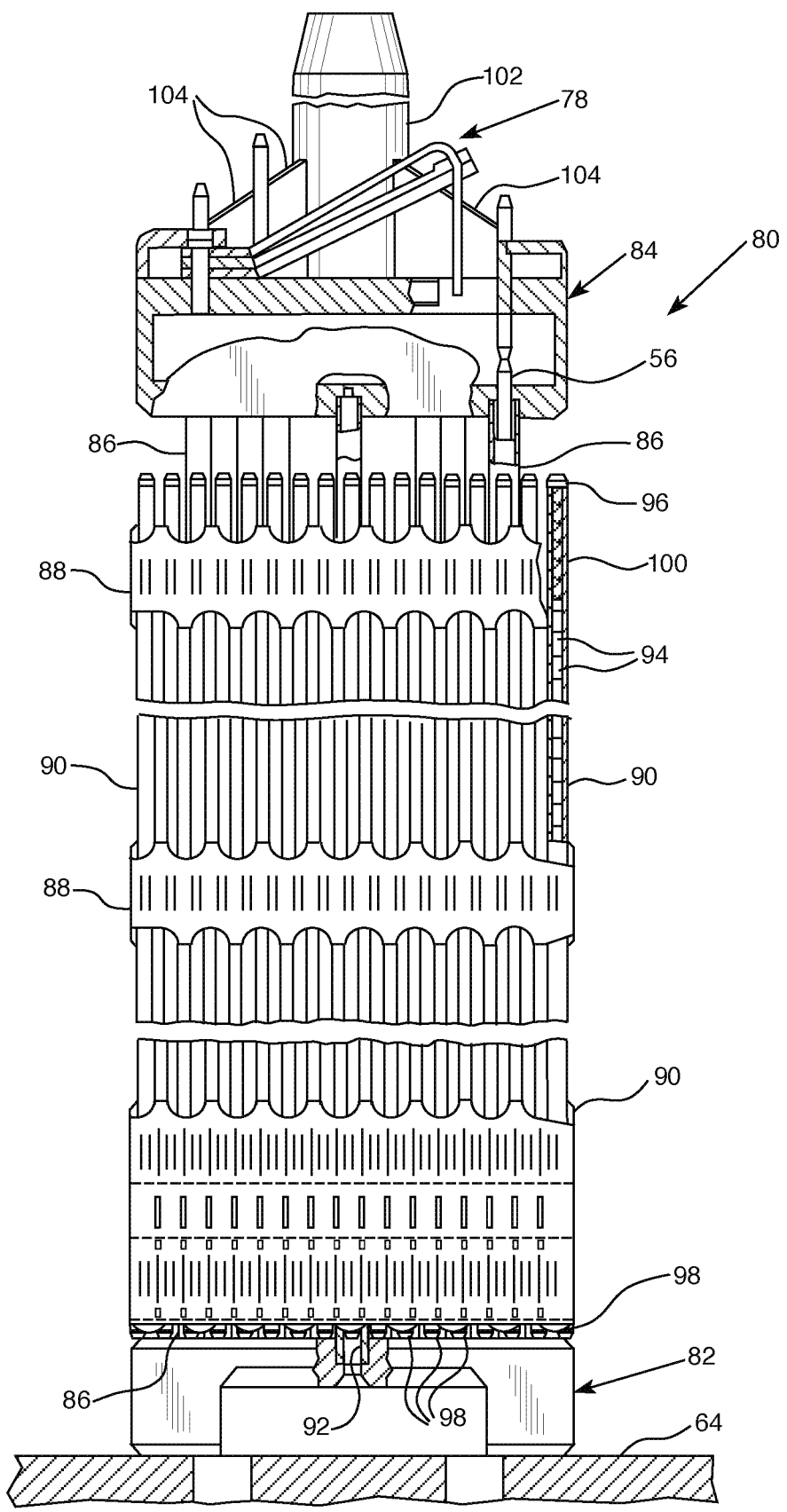
FIG. 6 is an elevational view, partially in section, of a nuclear fuel assembly that contains an in-core nuclear instrument thimble assembly.

FIG. 6 is an elevational view represented in vertically shortened form, of a fuel assembly being generally designated by reference character 80. The fuel assembly 80 is the type used in a pressurized water reactor, such as the reactor of FIG. 5, and has a structural skeleton which at its lower end includes a bottom nozzle 82. The bottom nozzle 82 supports the fuel assembly on the lower core support plate 64 in the core region of the nuclear reactor. In addition to the bottom nozzle 82, the structural skeleton of the fuel assembly 80 also includes a top nozzle 84 at its upper end and a number of guide tubes or thimbles 86 which extend longitudinally between the bottom and top nozzles 82 and 84 and at opposite ends are rigidly attached thereto.

The fuel assembly 80 further includes a plurality of transverse grids 88 axially spaced along and mounted to the guide thimbles 86 (also referred to as guide tubes) and an organized array of elongated fuel rods 90 transversely spaced and supported by the grids 88. Although it cannot be seen in FIG. 6, the grids 88 are conventionally formed from orthogonal straps that are interleaved in an egg-crate pattern with the adjacent interface of four straps defining approximately square support cells through which the fuel rods 90 are supported in transversely spaced relationship with each other. In many conventional designs, springs and dimples are stamped into the opposing walls of the straps that form the support cells. The springs and dimples extend radially into the support cells and capture the fuel rods therebetween; inserting pressure on the fuel rod cladding to hold the rods in position. Also, the assembly 80 has an instrumentation tube 92 located in the center thereof that extends between and is mounted to the bottom and top nozzles 82 and 84. With such an arrangement of parts, the fuel assembly 80 forms an integral unit capable of being conveniently handled without damaging the assembly of parts.

As mentioned above, the fuel rods 90 in the array thereof in the assembly 80 are held in spaced relationship with one another by the grids 88 spaced along the fuel assembly length. Each fuel rod 90 includes a plurality of nuclear fuel pellets 94 and is closed at its opposite ends by upper and lower end plugs 96 and 98. The fuel pellets 94 are maintained in a stack by a plenum spring 100 disposed between the upper end plug 96 in the top of the pellet stack. The fuel pellets 94, composed of fissile material, are responsible for creating the reactive power of the reactor. The cladding, which surrounds the pellets, functions as a barrier to prevent fission byproducts from entering the coolant and further contaminating the reactor system.

To control the fission process, a number of control rods 56 are reciprocally movable in the guide thimbles 86 located at predetermined positions in the fuel assembly 80. Specifically, a rod cluster control mechanism (also referred to as a spider assembly) 78 positioned above the top nozzle 84 supports the control rods 56. The rod cluster control mechanism has an internally threaded cylindrical hub member 102 with a plurality of radially extending flukes or arms 104 that with the control rods 56 form the spider assembly 78 that was previously mentioned with respect to FIG. 5. Each arm 104 is interconnected to the control rods 56 such that the control mechanism 78 is operable to move the control rods vertically in the guide thimbles to thereby control the fission process in the fuel assembly 80, under the motor power of control rod drive shafts 76 (shown in FIG. 5) which are coupled to the control rod hubs 102, all in a well known manner.

Figure 7:
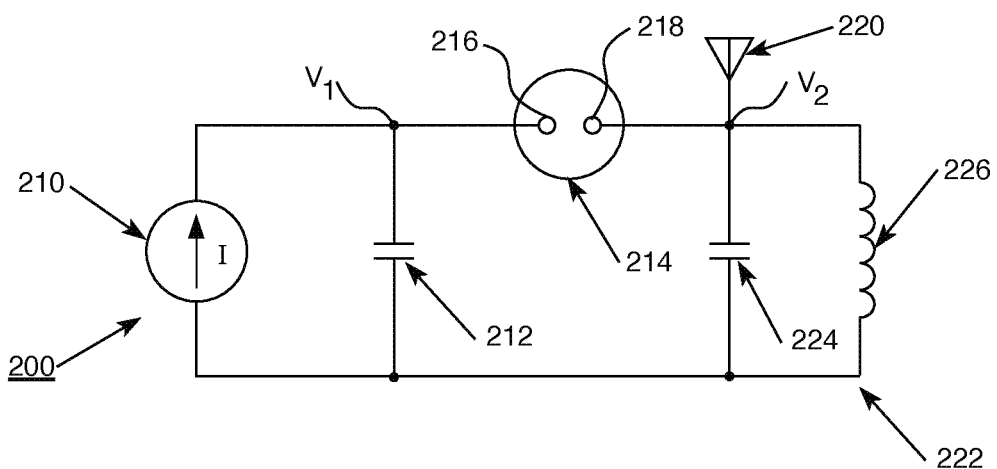
FIG. 7 is a schematic circuitry diagram of a transmitter device, in accordance with one non-limiting embodiment of the disclosed concept.

FIG. 7 shows a schematic circuitry diagram of a transmitter device 200, in accordance with one non-limiting embodiment of the disclosed concept. The example transmitter device 200 is preferably located within one of the instrument thimbles 86 of the fuel assembly of FIG. 6. As will be discussed in greater detail hereinbelow, the transmitter device 200 allows an environmental condition (e.g., without limitation, neutron flux) within the instrument thimble 86 (FIG. 6) to be monitored wirelessly.

The example transmitter device 200 includes a self-powered neutron detector 210, a first capacitor 212 electrically connected in parallel with the neutron detector 210, a gas discharge tube 214, an antenna 220, and an oscillator circuit 222. One example of a suitable gas discharge tube that may be employed in the disclosed concept is presently offered for sale by Littlefuse, Inc., of Chicago, Ill., and has a product name Gas Discharge Tube. The gas discharge tube 214 has an input end 216 and an output end 218. In one example embodiment, the gas discharge tube 214 is designed as a spark gap device wherein an arc, or spark, occurs when the input end 216 is electrically connected with the output end 218. In another example embodiment, the gas discharge tube 214 is designed to operate with a relatively less intense glow discharge occurring when the input end 216 electrically connects with the output end 218. The input end 216 is electrically connected with the first capacitor 212, and the output end 218 is electrically connected with the antenna 220. As shown, the oscillator circuit 222 includes a second capacitor 224 and an inductor 226 electrically connected in parallel with the second capacitor 224. The second capacitor 224 and the inductor 226 are each electrically connected with the output end 218 and the antenna 220.

In operation, when the transmitter device 200 is located within one of the instrument thimbles 86 (FIG. 6), the neutron detector 210 absorbs neutrons, causing electrons to migrate outwardly and thus create a current. Accordingly, the neutron detector 210, and thus the transmitter device 200, is advantageously self-powered (i.e., devoid of a separate powering mechanism). As the neutron detector 210 generates a current, it charges the first capacitor 212.

Figure 8:
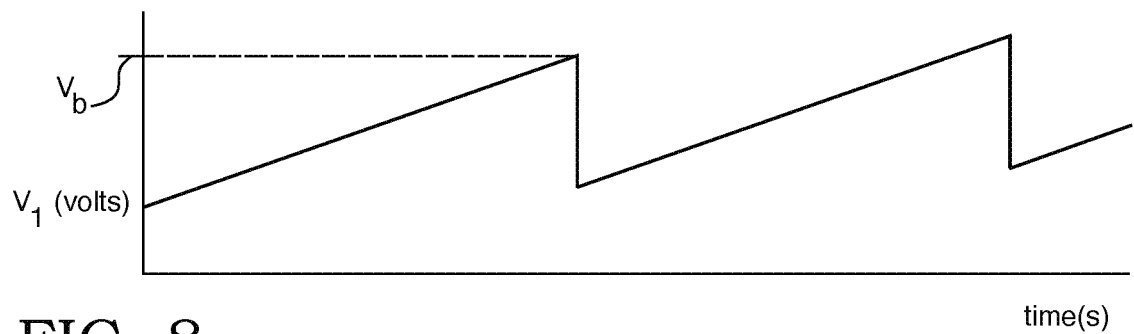
FIG. 8 is a graph showing voltage at a location in the transmitter device of FIG. 7 versus time.

FIG. 8 shows a graph of voltage $V_1$ versus time measured at the first capacitor 212. As shown, the voltage $V_1$ increases until a voltage $V_b$ is reached. The voltage $V_b$ is the breakdown voltage of the gas discharge tube 214. Once the breakdown voltage $V_b$ is reached, the gas discharge tube 214 becomes conductive such that the input end 216 and the output end 218 electrically connect the first capacitor 212 to the antenna 220 and the oscillator circuit 222. The oscillator circuit 222 is an inherently unstable circuit. As such, when the breakdown voltage $V_b$ is reached, an intense oscillation is triggered in the oscillator circuit 222 for a short period of time.

Figure 9:
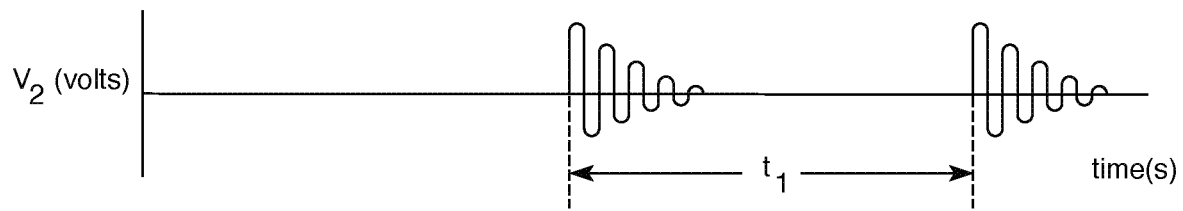
FIG. 9 is a graph showing voltage at another location in the transmitter device of FIG. 7 versus time.

FIG. 9 shows a graph of voltage $V_2$ versus time measured in the oscillator circuit 222. As shown, the voltage $V_2$ generally begins at zero volts, oscillates for a relatively short period of time, and thereafter returns to zero volts before repeating the cycle. The dampening of the oscillations is due to energy being dissipated by electromagnetic emissions from the antenna 220 and resistive losses. Accordingly, the oscillator circuit 222 pulses the antenna 220, which emits a wireless signal.

It will be appreciated that the period between the pulsed signals emitted by the antenna 220 corresponds inversely to the neutron flux detected by the neutron detector 210. More specifically, the current generated by the neutron detector 210 is directly proportional to the neutron flux within the instrument thimble 86 (FIG. 6), and the breakdown voltage $V_b$ is relatively constant. As such, the period between pulses (see, for example, $t_1$ in FIG. 9) is also inversely proportional to the neutron flux within the instrument thimble 86 (FIG. 6). Therefore, a suitable wireless receiver receiving the signal emitted by the antenna 220 can readily be calibrated to determine the neutron flux within the instrument thimble 86 (FIG. 6). Additionally, the energy of the pulsed transmissions of the antenna 220 remains essentially the same even if the reactor core power is very low. The pulses simply occur less often. Furthermore, because the frequency of the transmitter device 200 is independent of pulse operation, a device designer is able to select the frequency of the transmitter device 200. This advantageously facilitates the use of many different transmitter devices at different locations in the fuel assembly 80, and in other fuel assemblies in the core. An operator would be able to identify each individual transmitter device by its associated frequency, which is dependent on the values of the capacitance of the second capacitor 224 and the inductance of the inductor 226. Accordingly, environmental conditions such as neutron flux are advantageously able to be monitored wirelessly at many different locations within the fuel assembly 80.

Figure 10:
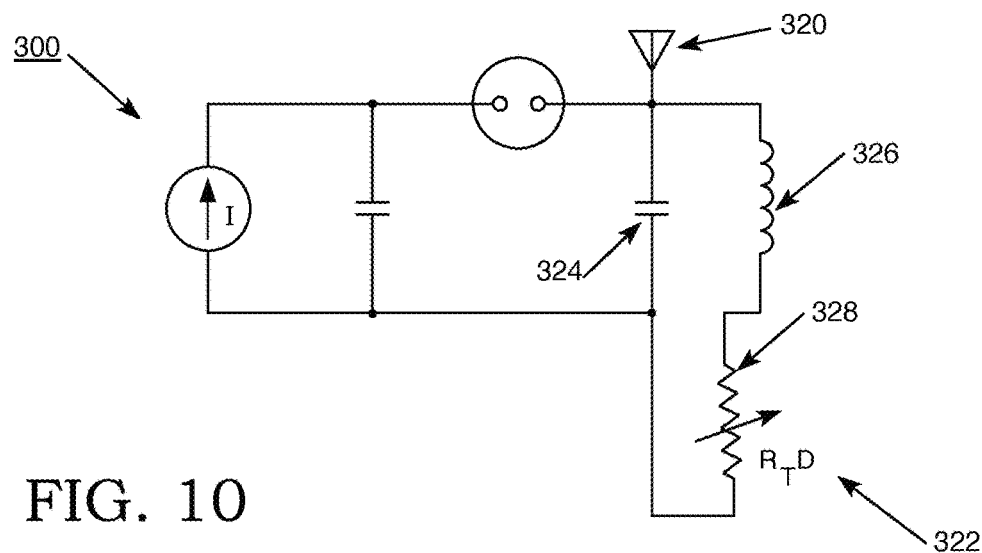
FIG. 10 is a schematic circuitry diagram of another transmitter device, in accordance with another non-limiting embodiment of the disclosed concept.

FIG. 10 shows a schematic circuitry diagram of another transmitter device 300, in accordance with another non-limiting embodiment of the disclosed concept. As shown, the transmitter device 300 is structured similar to the transmitter device 200 (FIG. 7), and like components are labeled with like reference numbers. For ease of illustration and economy of disclosure, only the antenna 320 and the oscillator circuit 322 are indicated with reference numbers. However, as shown, the oscillator circuit 322 of the transmitter device 300 further includes a resistance temperature detector 328 electrically connected in series with the inductor 326 and electrically connected to the second capacitor 324. The resistance temperature detector 328 increases its electrical resistance as the temperature of the environment in which it is located increases. In accordance with one aspect of the disclosed concept, the resistance temperature detector 328 alters the signal emitted by the antenna 320 in a detectable way. More specifically, the amplitude decay rate of the voltage of the oscillator circuit 322 will be altered with the inclusion of the resistance temperature detector 322. Accordingly, the change in the amplitude decay rate measured by a suitable wireless receiver will allow an operator to readily determine a given temperature at a location within the instrument thimble 86 (FIG. 6). It follows that the transmitter device 300 is advantageously able to provide an indication to an operator of neutron flux (i.e., in the same manner as the transmitter device 200 shown in FIG. 7) and also temperature within the instrument thimble 86 (FIG. 6).

Figure 11:
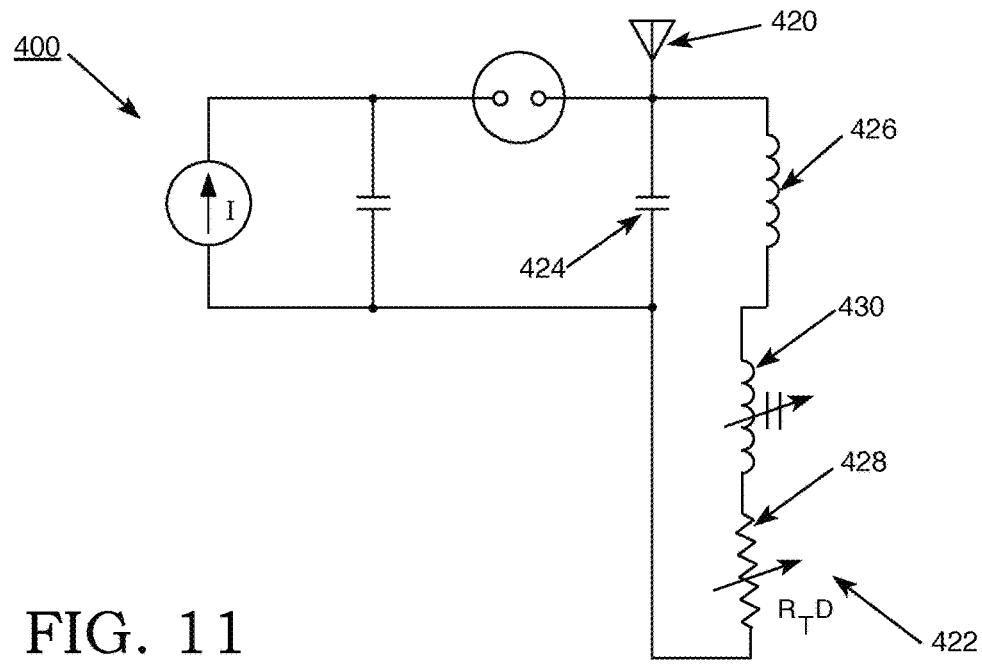
FIG. 11 is a schematic circuitry diagram of another transmitter device, in accordance with another non-limiting embodiment of the disclosed concept.
Figure 12:
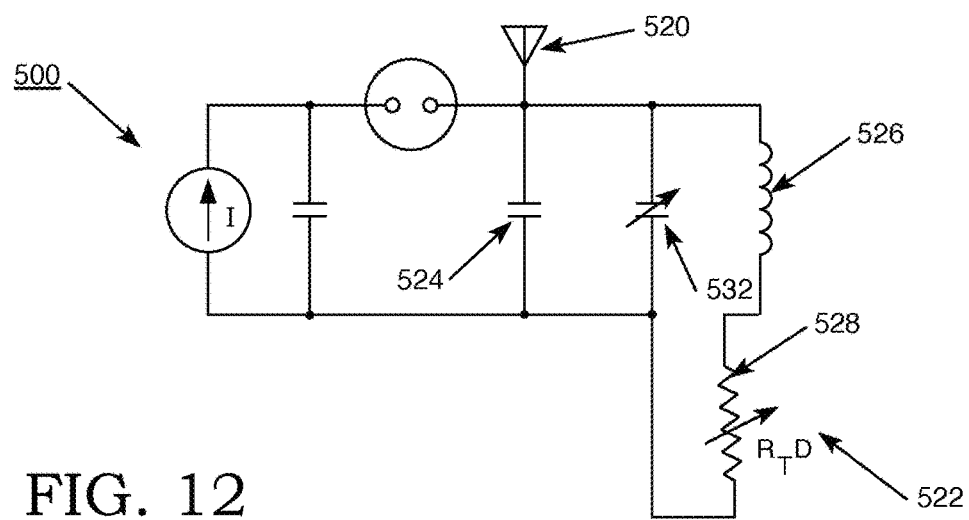
FIG. 12 is a schematic circuitry diagram of another transmitter device, in accordance with another non-limiting embodiment of the disclosed concept.

FIGS. 11 and 12 show schematic circuitry diagrams of two other transmitter devices 400,500, respectively, in accordance with other non-limiting embodiments of the disclosed concept. As shown, the transmitter devices 400, 500 are structured similar to the transmitter devices 200,300 (FIGS. 7 and 10), and like components are labeled with like reference numbers. For ease of illustration and economy of disclosure, only the antennas 420 and the oscillator circuits 422,522 are identified with reference numbers. As shown in FIG. 11, the oscillator circuit 422 further includes a second inductor (e.g., without limitation, variable inductor 430) electrically connected in series with the first inductor 426 and the resistance temperature detector 428. Furthermore, the variable inductor 430 is electrically connected to with the second capacitor 424. As shown in FIG. 12, the oscillator circuit 522 further includes a variable capacitor 532 electrically connected in parallel with the second capacitor 524. The variable capacitor 532 is also electrically connected to the inductor 526 and the resistance temperature detector 528. Advantageously, environmentally induced changes in the electrical values of either the variable inductor 430 or the variable capacitor 532 will produce a detectable shift in the pulse transmission frequency.

It will be appreciated that the transmitter devices 400,500 are advantageously able to provide an indication to an operator of up to three environmental conditions within the instrument thimble 86 (FIG. 6). For example, the transmitter devices 400,500 each, via the emitted signals of the respective antennas 420,520, are each able to communicate to a wireless receiver data corresponding to the neutron flux and the temperature within the instrument thimble 86 (FIG. 6) in the same manner as the transmitter device 300, discussed above. Additionally, the variable inductor 430 (FIG. 11) and the variable capacitor 532 (FIG. 12) are each structured to alter the frequency of the emitted signal of the respective antennas 420,520 in a detectable way. The altered frequency provides a mechanism by which a third environmental condition (e.g., without limitation, pressure, total neutron dose of a fuel rod over time, water flow rate) can be measured by the transmitter devices 400,500 and reported wirelessly to a suitable receiver. For example, the pressure within a fuel rod may create a deformation that causes a movement near a coil of the variable inductor 430 to cause a detectable frequency shift in the emitted signal of the antenna 420, thus allowing the pressure to be monitored wirelessly.

Figure 13:
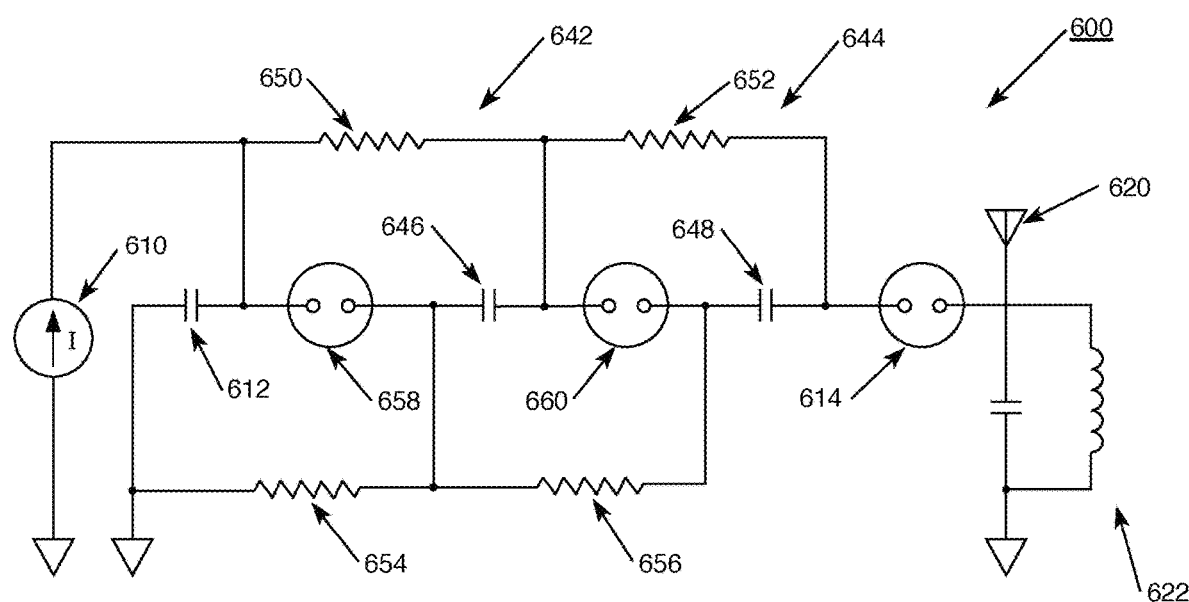
FIG. 13 is a schematic circuitry diagram of another transmitter device, in accordance with another non-limiting embodiment of the disclosed concept.

FIG. 13 shows a schematic circuitry diagram of another transmitter device 600, in accordance with another non-limiting embodiment of the disclosed concept. As shown, the transmitter device 600 is structured similar to the transmitter devices 200,300,400,500 (FIGS. 7 and 10-12), and like components are labeled with like reference numbers. More specifically, the transmitter device 600 includes a neutron detector 610, a capacitor 612, a gas discharge tube 614, an antenna 620, and an oscillator circuit 622 that each perform the same functions as the respective components of the transmitter devices 200,300,400,500 (FIGS. 7 and 10-12). As shown, the transmitter device 600 further includes a number of Marx bank stages (e.g., two Marx bank stages 642,644 are shown) electrically connected between the neutron detector 610 and the gas discharge tube 614. It will be appreciated that any suitable alternative number of Marx bank stages may be employed ahead of a gas discharge tube (i.e., and after a neutron detector) in order to perform the desired function of enhancing circuit performance. The Marx bank stages 642,644 each include a respective capacitor 646,648, a respective first resistor 650,652, a respective second resistor 654,656, and a respective gas discharge tube 658,660.

It will be appreciated that a method of measuring a number of environmental conditions with a transmitter device 200,300,400,500,600 includes the steps of detecting neutron flux with a neutron detector 210,610 storing energy in a capacitor 212,612 until a breakdown voltage $V_b$ of a gas discharge tube 214,614 is reached, and emitting a signal with an antenna 220,320,420,520,620 corresponding to the neutron flux. The method may further include the steps of pulsing the antenna 220,320,420,520,620 with an oscillator circuit 222,322,422,522,622 altering the signal emitted by the antenna 220,320,420,520,620 with a resistance temperature detector 328,428,528, and/or altering the signal emitted by the antenna 220,320,420,520,620 with a variable inductor 430 or a variable capacitor 532.

The novel transmitter devices 200,300,400,500,600 are able to measure the disclosed environmental conditions within the instrument thimble 86 (FIG. 6) and withstand the relatively harsh operating conditions for at least two reasons. First, the transmitter devices 200,300,400,500,600 are each advantageously devoid of semiconductors. Second, the transmitter devices 200,300,400,500,600 generally include only one single powering mechanism (e.g., the respective neutron detectors (only the neutron detectors 210,610 are indicated)). Known attempts at providing a wireless mechanism to communicate data on environmental conditions typically require more power than is available from a neutron detector, and/or are not able to withstand the relatively harsh radiation environment due to the inclusion of semiconductors. Additionally, known devices (not shown) exhibit relatively low transmitter power, and as such shutdown completely when the reactor power is decreased below a critical threshold. The transmitter devices 200,300,400, 500,600 are novel in their combination of a self-powered neutron detector 210,610 and energy storage capacitor 212, 612 to achieve reasonable transmission power over a wide reactor power range. Furthermore, as discussed, the transmitter devices 400,500 are advantageously able to transmit readings on up to three different environmental parameters concurrently from a given sensing location within the instrument thimble 86. Moreover, because all of the monitoring is being done wirelessly, the need for major reactor vessel penetrations and cabling to monitor environmental conditions is reduced and/or eliminated.

Accordingly, the disclosed concept provides for an improved (e.g., without limitation, better able to monitor environmental conditions within an instrument thimble 86) nuclear reactor system, transmitter device 200,300,400,500, 600 therefor, and associated method of measuring environmental conditions.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A method of measuring a number of environmental conditions with a transmitter device, said transmitter device comprising a neutron detector, a capacitor electrically connected in parallel with said neutron detector, a gas discharge tube comprising an input end and an output end, and an antenna electrically connected to said output end, said input end being electrically connected with said capacitor, the method comprising the steps of:
    detecting neutron flux with said neutron detector;
    storing energy in said capacitor until a breakdown voltage of said gas discharge tube is reached; and
    emitting a signal with said antenna corresponding to the neutron flux.

2. The method of claim 1 wherein said transmitter device further comprises an oscillator circuit electrically connected with said output end and said antenna; and wherein the method further comprises:
    pulsing said antenna with said oscillator circuit.

3. The method of claim 2 wherein said oscillator circuit comprises a second capacitor, an inductor electrically connected to said second capacitor, and a resistance temperature detector electrically connected in series with said inductor; wherein said second capacitor and said inductor are each electrically connected with said antenna; and wherein the method further comprises:
    altering the signal emitted by said antenna with said resistance temperature detector.

4. The method of claim 2 wherein said oscillator circuit comprises a second capacitor, an inductor electrically connected to said second capacitor, and a second inductor electrically connected in series with said inductor; wherein said second capacitor and said inductor are each electrically connected with said antenna; and wherein the method further comprises:
    altering the signal emitted by said antenna with said second inductor.

* * * * *